(12) United States Patent
Misgeld et al.

(10) Patent No.: US 12,384,487 B2
(45) Date of Patent: Aug. 12, 2025

(54) ELECTRIC BICYCLE

(71) Applicant: SRAM, LLC, Chicago, IL (US)

(72) Inventors: Berno Johannes Engelbert Misgeld, Neuss (DE); Dietmar Greven, Dormagen (DE)

(73) Assignee: SRAM, LLC, Chicago, IL (US)

( * ) Notice: Subject to any disclaimer, the term of this patent is extended or adjusted under 35 U.S.C. 154(b) by 527 days.

(21) Appl. No.: 17/915,484

(22) PCT Filed: Mar. 11, 2021

(86) PCT No.: PCT/EP2021/056239
§ 371 (c)(1),
(2) Date: Sep. 29, 2022

(87) PCT Pub. No.: WO2021/197800
PCT Pub. Date: Oct. 7, 2021

(65) Prior Publication Data
US 2023/0150608 A1  May 18, 2023

(30) Foreign Application Priority Data

Apr. 3, 2020 (EP) .................................... 20167912

(51) Int. Cl.
*B62M 6/45* (2010.01)
*B62M 6/50* (2010.01)
*B62M 6/60* (2010.01)
(52) U.S. Cl.
CPC ................ *B62M 6/45* (2013.01); *B62M 6/50* (2013.01); *B62M 6/60* (2013.01)

(58) Field of Classification Search
CPC . B62M 6/45; B62M 6/50; B62M 6/60; B62M 6/65
See application file for complete search history.

(56) References Cited

U.S. PATENT DOCUMENTS 10,144,485 B2 * 12/2018 Stegmaier ............... B60L 15/20
10,589,820 B2 *  3/2020 Baumgaertner ......... B62M 6/50
(Continued)

FOREIGN PATENT DOCUMENTS

DE     102011082088 A1 *  3/2013 ............ B60L 11/007
DE     102012222854 A1 *  6/2014 ............ B60L 11/007
(Continued)

*Primary Examiner* — Adam D Rogers
(74) *Attorney, Agent, or Firm* — Norman B. Thot

(57) ABSTRACT

An electric bicycle includes a front wheel, a rear wheel, an electric traction motor which drives the front and/or rear wheel, a traction battery which supplies the electric traction motor with electrical power, a controller for actuating the electric traction motor, a pushing-aid controller for controlling an adaptive pushing-aid function which is assisted by the electric traction motor depending on an interaction force between a person pushing and the electric bicycle, an inclination sensor for determining an inclination angle of the electric bicycle relative to the ground, a traction-motor torque determining device for determining a current traction-motor torque, an electric-bicycle speed sensor for determining a current electric-bicycle speed, and an electric-bicycle weight memory which stores a current electric-bicycle weight value. The interaction force is determined by the pushing-aid controller from the inclination angle, the current traction-motor torque, the current electric-bicycle speed, and the current electric-bicycle weight value.

4 Claims, 2 Drawing Sheets

(56) References Cited

U.S. PATENT DOCUMENTS

| | | | |
|---|---|---|---|
| 10,919,601 B2 * | 2/2021 | Baumgaertner | ......... B62M 6/50 |
| 11,124,266 B2 * | 9/2021 | Shahana | .............. B62K 25/286 |
| 11,180,216 B2 * | 11/2021 | Greven | .................... B62M 6/45 |
| 11,701,536 B2 * | 7/2023 | Fuchs | ................ A63B 21/0054 482/2 |
| 2017/0349236 A1 | 12/2017 | Baumgaertner et al. | |
| 2018/0086417 A1 | 3/2018 | Baumgaertner et al. | |
| 2024/0400159 A1 * | 12/2024 | Stegmaier | .............. B62M 25/08 |

FOREIGN PATENT DOCUMENTS

| | | | | |
|---|---|---|---|---|
| DE | 102016209570 B3 * | 8/2017 | | ............. B62M 6/45 |
| DE | 102016204119 A1 * | 9/2017 | | ............. B62M 6/45 |
| EP | 3 251 936 A1 | 12/2017 | | |
| EP | 3299272 A1 * | 3/2018 | | ............. B62M 6/45 |
| JP | 2019-155963 A | 9/2019 | | |

* cited by examiner

ELECTRIC BICYCLE

CROSS REFERENCE TO PRIOR APPLICATIONS

This application is a U.S. National Phase application under 35 U.S.C. § 371 of International Application No. PCT/EP2021/056239, filed on Mar. 11, 2021 and which claims benefit to European Patent Application No. 20167912.3, filed on Apr. 3, 2020. The International Application was published in German on Oct. 7, 2021 as WO 2021/197800 A1 under PCT Article 21(2).

FIELD

The present invention relates to a multi-wheeled electric bicycle comprising a traction motor, which drives at least one front wheel and/or at least one rear wheel, and comprising a pushing-aid controller, which provides a pushing-aid function via which the electric bicycle is assistively driven in pushing operation, i.e., when a person is pushing the electric bicycle and not using the pedals, via the traction motor up to a, for example, legally determined speed limit.

An electric bicycle comprising a pushing-aid controller that sets a constant pushing speed in pushing mode is described in DE 10 2016 209 570 B3. This speed may, however, be too high for the person pushing, for example, if the person is on an incline which the person is unable to walk up at the same speed as the person would, for example, walk on a horizontal plane.

SUMMARY

An aspect of the present invention is to provide an electric bicycle comprising a cost-effective adaptive pushing-aid controller.

In an embodiment, the present invention provides an electric bicycle which includes a front wheel, a rear wheel, an electric traction motor which drives at least one of the front wheel and the rear wheel, a traction battery which supplies the electric traction motor with an electrical power, an electric-bicycle controller for actuating the electric traction motor, a pushing-aid controller for controlling an adaptive pushing-aid function which is assisted by the electric traction motor depending on a forward-directed interaction force between a person pushing and the electric bicycle, an inclination sensor for determining an inclination angle of the electric bicycle relative to the horizontal of the ground, a traction-motor torque determining device for determining a current traction-motor torque, an electric-bicycle speed sensor for determining a current electric-bicycle speed, and an electric-bicycle weight memory in which is stored a current electric-bicycle weight value. The forward-directed interaction force between the person pushing and the electric bicycle is determined by the pushing-aid controller from the inclination angle, the current traction-motor torque, the current electric-bicycle speed, and the current electric-bicycle weight value.

BRIEF DESCRIPTION OF THE DRAWINGS

The present invention is described in greater detail below on the basis of embodiments and of the drawings in which.

DETAILED DESCRIPTION

Figure 1:
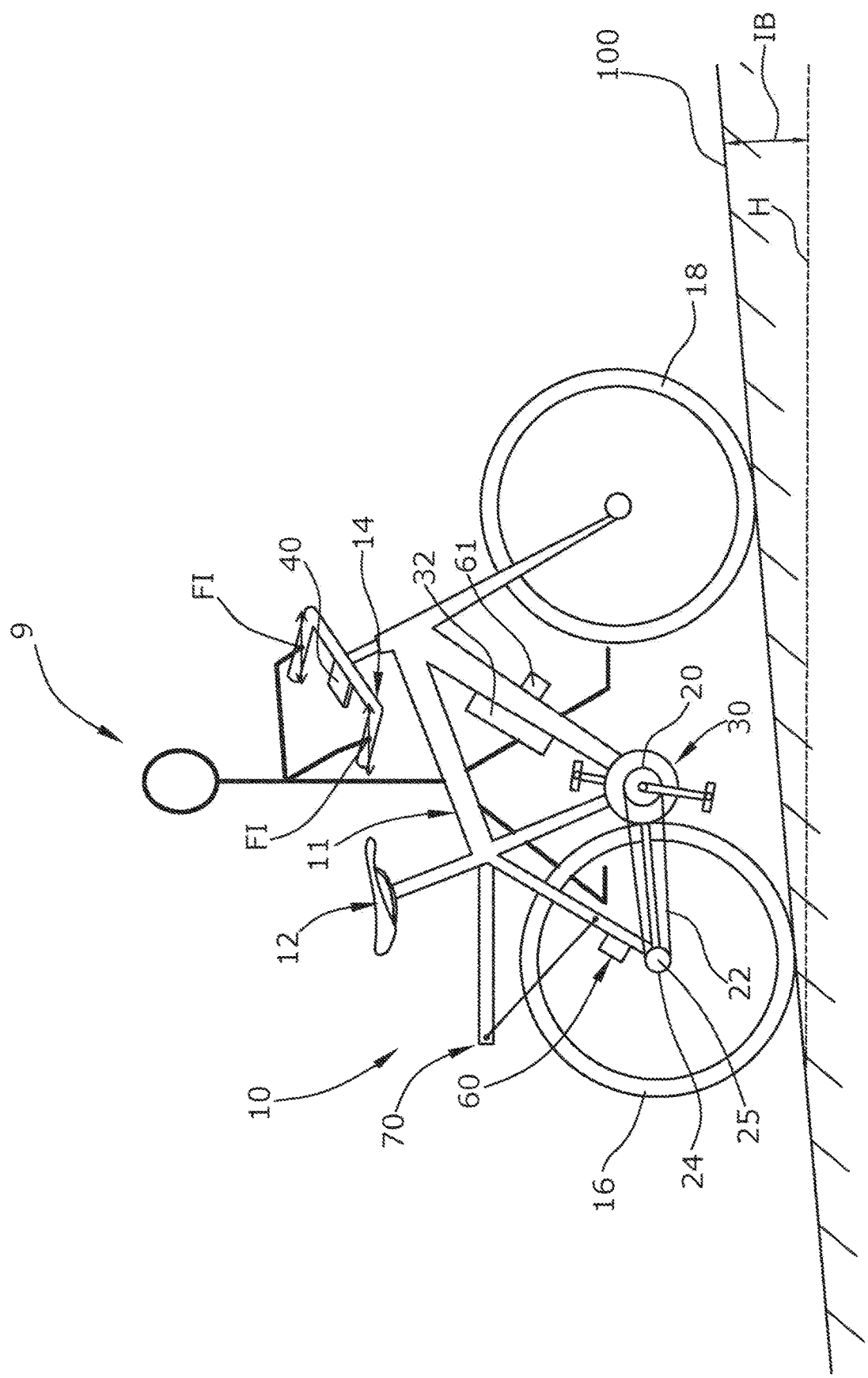
FIG. 1 shows an electric bicycle in a pushing operation in which the electric bicycle is being pushed by a person.
Figure 2:
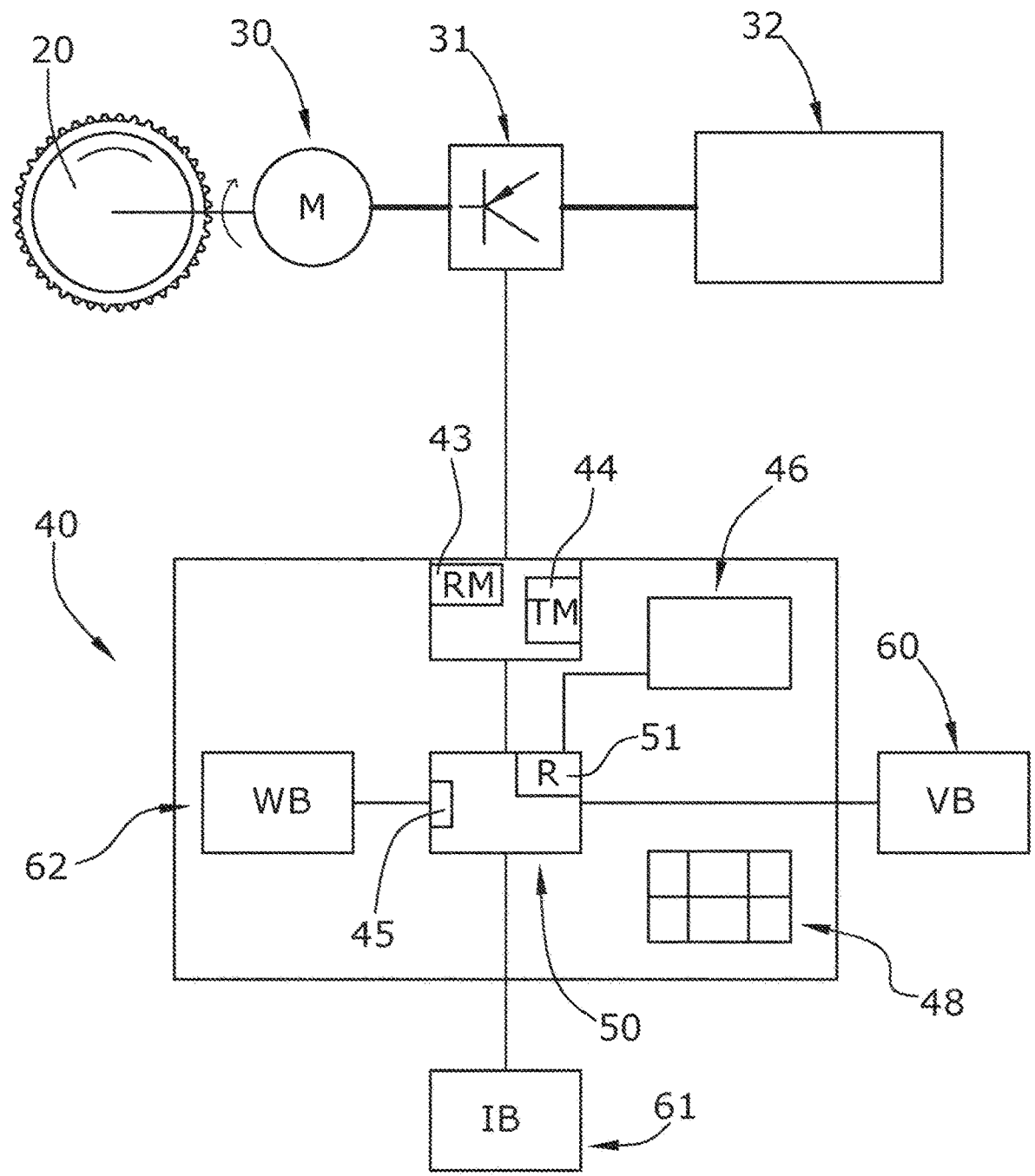
FIG. 2 shows a schematic plan view of the electric-bicycle controller, including a pushing-aid controller.

The electric bicycle according to the present invention comprises a front wheel, a rear wheel, an electric traction motor, which drives the front wheel and/or the rear wheel, a traction battery for supplying the traction motor with electrical power, and an electric-bicycle controller for actuating the traction motor. The electric bicycle further comprises an adaptive pushing-aid controller which provides an auto-adaptive pushing-aid function assisted by the traction motor depending on an interaction force between the person pushing and the electric bicycle. An auto-adaptive pushing-aid function is understood to mean a pushing-aid assistance function which controls the drive power of the traction motor in a pushing mode depending on the interaction force between the person pushing and the electric bicycle. When the interaction force is increased in the electric-bicycle pushing direction, the drive power of the traction motor is increased, whereas, when the interaction force is decreased, the drive power of the traction motor is decreased or reduced to zero. The drive power of the traction motor can in principle be increased or decreased in various ways, for example, by increasing or decreasing the target speed as a manipulated variable and/or by increasing or decreasing the traction-motor drive power as a manipulated variable.

The present invention provides that a force sensor that directly determines the interaction force is not used for determining the interaction force, and therefore this sensor can be completely omitted where appropriate. A force sensor of this kind, which could be arranged in the region of the handlebar stem, for example, is complex and technically challenging. A force sensor of this kind can furthermore only detect interaction forces acting on the electric-bicycle handlebars, but cannot detect any interaction forces acting at another point on the electric bicycle.

The electric bicycle comprises an inclination sensor for determining the current inclination angle of the electric bicycle relative to the horizontal of the ground in the pushing direction or in the longitudinal direction of the electric bicycle.

The electric bicycle further comprises a traction-motor torque determining device for precisely determining the current traction-motor torque in real time. The traction-motor torque determining device precisely determines the electrical torque generated by the traction motor at any given moment. This may be carried out by a current measurement being taken electrically between the power electronics and the mechanical traction motor in order to thus determine the actual total electrical drive power of the traction motor as precisely as possible.

The electric bicycle further comprises an electric-bicycle speed sensor via which the current speed of the electric bicycle over the ground is precisely determined in real time. This may be carried out, for example, by a corresponding, high-resolution speed sensor arranged on a rear wheel or on a front wheel of the electric bicycle.

The electric bicycle lastly comprises an electric-bicycle weight memory in which the current electric-bicycle weight value is stored. The electric-bicycle weight may be programmed or stored as a constant weight value. The electric-bicycle weight may, however, for example, be determined by a total-weight determining device at regular intervals or, for example, every time the electric-bicycle controller is switched on, for example, via corresponding, brief acceleration measurements on the electric bicycle when it is not being ridden. The total-weight determining device transmits the currently determined electric-bicycle weight value to the electric-bicycle weight memory.

The present invention provides that the pushing-aid controller determines the forward-directed interaction force, with respect to the electric bicycle, which acts between the person pushing the electric bicycle and the electric bicycle. The interaction force is determined by the pushing-aid controller from the current inclination angle, the current traction-motor torque, the current electric-bicycle speed, and the current electric-bicycle weight value. In principle, the pushing-aid controller determines the interaction force from the expected electric-bicycle acceleration by the motor, which results from the traction-motor torque, the electric-bicycle inclination angle and the electric-bicycle weight, and the actual electric-bicycle acceleration, which results from the progression over time of the current electric-bicycle speed values. If the difference between the expected electric-bicycle acceleration and the actual electric-bicycle acceleration is virtually zero, the interaction force is also zero. For an interaction force of less than zero, the drive power of the traction motor is reduced, since it is assumed that the person pushing wants to reduce the pushing speed.

If the interaction force is significantly above zero, it is assumed that the person pushing wants to increase the pushing speed, and therefore the drive power of the traction motor is accordingly also increased.

In a pushing operation above a maximum permissible pushing speed, however, the drive power of the traction motor is accordingly down-regulated. For example, in Germany, the maximum permissible pushing speed is set at 6 km/h, and the traction motor therefore cannot provide any further assistance above this maximum permissible pushing speed.

With the pushing-aid controller according to the present invention, by using sensors and data that are available on an electric bicycle anyway, an auto-adaptive pushing aid is provided which does not require any considerable additional complexity in terms of hardware. The adaptivity of the pushing aid allows the pushing aid to be economically and intuitively controlled by the person pushing. The person pushing is also not limited to introducing the interaction forces into the electric bicycle only via the handlebars, but can, for example, instead can also grasp or hold the electric bicycle by the bicycle saddle, the luggage rack or directly by the frame and can apply the interaction forces at these points.

In an electric bicycle having a continuous or stepped variable-speed gear, a traction-motor rotational-speed determining device which determines the rotational speed of the traction motor can, for example, be provided between the traction motor and the driven wheel. The rotational speed of the traction motor can, for example, be determined by a rotational-position sensor that is integrated in the traction motor as standard, which sensor detects the motor-rotor position and is required anyway for controlling the commutation of an electronically commutated traction motor.

The electric-bicycle speed sensor is arranged on a front wheel and/or a rear wheel of the electric bicycle. The electric-bicycle speed is determined from the rotational speed of the front wheel or the rear wheel. A gear-ratio determining device, which determines a gear ratio of the variable-speed gear from the electric-bicycle speed and the traction-motor rotational speed, can, for example, be assigned to the pushing-aid controller. The gear ratio is therefore relevant because the torque acting on the driven front wheel or rear wheel is proportionally dependent on the ratio of the variable-speed gear. In a high gear, i.e., at a high gear ratio, the maximum drive torque available at the rear wheel or front wheel is relatively small, and therefore, with a high electric-bicycle weight and/or on an incline, there might not be enough torque to set the electric bicycle in motion.

If an unsuitable gear ratio of the variable-speed gear is determined, the gear-ratio determining device can, for example, output a switching or shifting recommendation, for example, on a display or a sound generator. A switching recommendation may alternatively or additionally also be output to an electrically switched variable-speed gear in the form of a shift command.

In a configuration of the present invention, a total-weight determining device can, for example, be provided which determines the current electric-bicycle weight and transmits this to the electric-bicycle weight memory as a weight value. In order to determine the electric-bicycle weight, one or more force sensors may be provided which, for example, determine the weight load of a luggage rack. The electric-bicycle weight may, however, also be determined by evaluating the electric-bicycle acceleration during a brief activation of the traction motor, or in other suitable ways. A current electric-bicycle weight value is then continuously stored in the electric-bicycle weight memory so that the interaction force is determined by the pushing-aid controller on the basis of a precise and current value for the electric-bicycle weight.

An exemplary embodiment of the present invention is explained in greater detail below under reference to the drawings.

FIG. 1 shows an electric bicycle 10, which is designed as what is known as a pedelec, comprising a rigid bicycle frame 11 which supports, for example, a front wheel 18, a rear wheel 16, a luggage rack 70, and a bicycle saddle 12. The electric bicycle 10 comprises an electric traction motor 30, which is designed as what is known as a mid-mounted motor, which is arranged in the region of the pedal shaft and which is driven by a chain ring 20 where required, via which the torque is transmitted to a rear-wheel sprocket 24 via a drive chain 22. In the present case, a manually actuated variable-speed gear 25 is assigned to the rear wheel 16, via which variable-speed gear 25 the gear ratio between the chain ring 20 and the rear-wheel rim can be set manually and in stages. The variable-speed gear 25 may alternatively also be continuous. In pedelec operation, the human drive power and the traction-motor drive power is added to the chain ring 20.

The electric bicycle 10 comprises a rechargeable traction battery 32 for supplying the traction motor 30 with electrical power. The electric bicycle 10 further comprises an electric-bicycle controller 40 via which, in pedelec operation, the drive power of the traction motor 30 is controlled on the basis of the human drive power. In the present case, the electric-bicycle controller 40 is in the form of an operating device on the handlebars 14, which comprises a keypad 48 and a visual display 46 as a human interface. The electric-bicycle controller 40 controls motor power electronics 31 which, where required, supply the traction motor 30 with the electrical power available from the traction battery 32.

In the present case, the electric bicycle 10 comprises an electric-bicycle speed sensor 60 on the rear wheel 16, which electric-bicycle speed sensor 60 outputs the current electric-bicycle speed VB with a high temporal resolution. A high resolution of the electric-bicycle speed sensor 60 is, for example, understood to mean a resolution of the transducer ring fastened to the rear wheel 16 of 6° or less. Via the high resolution of the electric-bicycle speed sensor 60, the electric-bicycle speed VB can, for example, be determined 60 times or more per revolution of the rear wheel 16 in real time so that also the current electric-bicycle acceleration AB can in particular be determined in real time and with a high temporal resolution. For a 26-inch or 28-inch rear wheel, the electric-bicycle speed VB and/or the electric-bicycle acceleration AB can thereby be determined approximately 30 times per second at a speed of 5 km/h, i.e., in a temporal resolution of approximately 35 ms.

The electric bicycle 10 comprises an inclination sensor 61 on the bicycle frame 11 via which inclination sensor 61 the electric-bicycle inclination angle IB of the electric bicycle 10 relative to the horizontal H of the ground is determined promptly, i.e., in real time. The electric-bicycle inclination angle IB approximately corresponds to the local inclination of the ground 100 on which the front wheel 18 and rear wheel 16 are standing, relative to the horizontal H of the ground. The inclination sensor may alternatively be provided in a drive unit, which also comprises a traction motor 30.

The electric bicycle 10 comprises a traction-motor torque determining device 44 via which the current electrical traction-motor torque TM is determined in real time. For this purpose, a current measurement may, for example, be configured in the region of the power electronics 31 so that the electrical traction-motor torque TM currently being output by the traction motor 30 can be directly inferred from the total motor current. The electric bicycle 10 further comprises a traction-motor rotational-speed determining device 43 which determines the rotational speed of the traction motor 30. The traction-motor rotational-speed determining device 43 may, for example, evaluate the signals from a rotor-position sensor provided in the traction motor 30, which rotor-position sensor is required for controlling the electrical commutation in an electronically commutated traction motor.

The electric bicycle 10 lastly comprises an electric-bicycle weight memory 62 within the electric-bicycle controller 40 in which the current electric-bicycle weight value WB of the electric bicycle 10 is stored.

A total-weight determining device 45, which determines the current electric-bicycle weight WB and transmits the value to the electric-bicycle weight memory 62, is assigned to the pushing-aid controller 50. The current electric-bicycle weight WB may, for example, be indirectly determined at regular intervals by evaluating a brief, purely motor-driven acceleration of the electric bicycle by the traction motor, for example, every time the electric-bicycle controller is switched on. The electric-bicycle weight value WB may alternatively be pre-programmed or may have been manually input.

The pushing-aid controller 50 is arranged within the electric-bicycle controller 40; the pushing-aid controller 50 does not necessarily have its own hardware, but can be configured merely as a software module. In a pushing mode, which can, for example, be manually switched on by a person 9 accordingly pushing and/or pressing a key on the keypad 48, the pushing-aid controller 50 determines an expected electric-bicycle acceleration AE from the current electric-bicycle inclination angle IB, the current electrical traction-motor torque TM, and the current electric-bicycle weight value WB, and compares the expected electric-bicycle acceleration AE with the current actual electric-bicycle speed VB or with the current actual electric-bicycle acceleration AB in the direction of travel of the electric bicycle.

The interaction force FI with which the person 9 is pushing the electric bicycle 10 is calculated from the difference between the expected electric-bicycle acceleration AE and the current measured electric-bicycle acceleration AB. Depending on the determined interaction force FI, the drive power of the traction motor 30 is then increased, decreased, not changed, or switched off where necessary. The adapted change in the drive power may, for example, be carried out by the target speed of the electric bicycle being accordingly changed in a speed-managed control process. Alternatively, the electric power fed to the traction motor 30 may, however, also simply be accordingly changed.

The pushing-aid controller 50 provides for a constant monitoring to provide that motor assistance is only provided up to a pushing speed limit of 6 km/h, for example.

The gear-ratio determining device 51, which determines the current gear ratio R of the variable-speed gear 25 from the current traction-motor rotational speed RM of the traction-motor rotational-speed determining device 43 and from the electric-bicycle speed VB of the electric-bicycle speed sensor 60, is assigned to the pushing-aid controller 50. In the event of an unsuitable or unfavorable gear ratio R of the variable-speed gear 25, a switching or shifting recommendation is output to the display 46, so that the person 9 pushing is provided with a visual prompting to manually set a more suitable gear ratio R for the pushing operation.

The present invention is not limited to embodiments described herein; reference should be had to the appended claims.

LIST OF REFERENCE NUMERALS

9 Person
10 Electric bicycle
11 Bicycle frame
12 Bicycle saddle
14 Handlebars
16 Rear wheel
18 Front wheel
20 Chain ring
22 Drive chain
24 Rear-wheel sprocket
25 Variable-speed gear
30 Traction motor
31 Power electronics
32 Traction battery
40 Electric-bicycle controller
43 Traction-motor rotational-speed determining device
44 Traction-motor torque determining device
45 Total-weight determining device
46 Display
48 Keypad
50 Pushing-aid controller
51 Gear-ratio determining device
60 Electric-bicycle speed sensor
61 Inclination sensor
62 Electric-bicycle weight memory
70 Luggage rack
100 Ground
AB Current electric-bicycle acceleration
AE Expected electric-bicycle acceleration
IB Electric-bicycle inclination angle
FI Interaction force
H Horizontal M Traction motor
R Gear ratio
RM Traction-motor rotational speed
TM Electrical traction-motor torque
VB Electric-bicycle speed
WB Current electric-bicycle weight

What is claimed is:

1. An electric bicycle comprising:
   a front wheel;
   a rear wheel;
   an electric traction motor which drives at least one of the front wheel and the rear wheel;
   a traction battery which supplies the electric traction motor with an electrical power;
   an electric-bicycle controller for actuating the electric traction motor;
   a pushing-aid controller for controlling an adaptive pushing-aid function which is assisted by the electric traction motor depending on a forward-directed interaction force between a person pushing and the electric bicycle;
   an inclination sensor for determining an inclination angle of the electric bicycle relative to the horizontal of the ground;
   a traction-motor torque determining device for determining a current traction-motor torque;
   an electric-bicycle speed sensor for determining a current electric-bicycle speed; and
   an electric-bicycle weight memory in which is stored a current electric-bicycle weight value,
   wherein,
   the forward-directed interaction force between the person pushing and the electric bicycle is determined by the pushing-aid controller from the inclination angle, the current traction-motor torque, the current electric-bicycle speed, and the current electric-bicycle weight value.

2. The electric bicycle as recited in claim 1, further comprising:
   a variable speed gear;
   a traction-motor rotational-speed determining device which determines a rotational speed of the electric traction motor; and
   a gear-ratio determining device which is assigned to the pushing-aid controller, the gear-ratio determining device determining a gear ratio of the variable-speed gear from the current electric-bicycle speed and the rotational speed of the electric traction motor,
   wherein,
   the electric-bicycle speed sensor is arranged on at least one of the front wheel and on the rear wheel of the electric bicycle, and
   the electric-bicycle speed is determined from a rotational speed of the front wheel or from a rotational speed of the rear wheel.

3. The electric bicycle as recited in claim 2, wherein the gear-ratio determining device outputs a switching recommendation if the gear ratio of the variable-speed gear is unsuitable.

4. The electric bicycle as recited in claim 1, further comprising:
   a total-weight determining device which determines the current electric-bicycle weight value and which transmits the current electric-bicycle weight value to the electric-bicycle weight memory.

* * * * *